(12) United States Patent
Bray

(10) Patent No.: US 7,697,166 B2
(45) Date of Patent: Apr. 13, 2010

(54) COLOR JOB OUTPUT MATCHING FOR A PRINTING SYSTEM

(75) Inventor: Daniel M. Bray, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 417 days.

(21) Appl. No.: 11/890,084

(22) Filed: Aug. 3, 2007

(65) Prior Publication Data

US 2009/0033954 A1 Feb. 5, 2009

(51) Int. Cl.
*G06F 15/00* (2006.01)

(52) U.S. Cl. .................. 358/1.9; 358/2.1; 358/3.23; 358/505; 358/504; 347/19

(58) Field of Classification Search .......... 358/1.9, 358/2.1, 3.23, 505, 504; 347/19
See application file for complete search history.

(56) References Cited

U.S. PATENT DOCUMENTS

| | | | |
|---|---|---|---|
| 4,579,446 A | 4/1986 | Fujino et al. | |
| 4,587,532 A | 5/1986 | Asano | |
| 4,836,119 A | 6/1989 | Siraco et al. | |
| 5,004,222 A | 4/1991 | Dobashi | |
| 5,008,713 A | 4/1991 | Ozawa et al. | |
| 5,080,340 A | 1/1992 | Hacknauer et al. | |
| 5,095,342 A | 3/1992 | Farrell et al. | |
| 5,159,395 A | 10/1992 | Farrell et al. | |
| 5,208,640 A | 5/1993 | Horie et al. | |
| 5,272,511 A | 12/1993 | Conrad et al. | |
| 5,326,093 A | 7/1994 | Sollitt | |
| 5,435,544 A | 7/1995 | Mandel | |
| 5,473,419 A | 12/1995 | Russel et al. | |
| 5,489,969 A | 2/1996 | Soler et al. | |
| 5,504,568 A | 4/1996 | Saraswat et al. | |
| 5,525,031 A | 6/1996 | Fox | |

(Continued)

OTHER PUBLICATIONS

Morgan, P.F., "Integration of Black Only and Color Printers", Xerox Disclosure Journal, vol. 16, No. 6, Nov./Dec. 1991, pp. 381-383.

(Continued)

*Primary Examiner*—Twyler L Haskins
*Assistant Examiner*—Michael Burleson
(74) *Attorney, Agent, or Firm*—Fay Sharpe LLP

(57) ABSTRACT

A printing system is provided for color job matching of the output from a plurality of image marking engines. The system includes a first test image printed by a first image marking engine on a media document. The first test image having a data glyph and a plurality of reference patches. The system further includes a second test image printed by a second image marking engine on the media document. The second test image having a data glyph and a plurality of reference patches. The first and second test images are printed on the same side of the media document. A scanner is provided for scanning the media document. The scanned first and second test images provide calibration data for matching color correction tables of the first image marking engine and the second image marking engine, wherein the data glyph and the reference patches of the scanned image data are compared with retrieved color correction tables for generating compensation values based on a difference between the scanned image set-up data and the color correction tables for at least a first subsequent image document on the first image marking engine or the second image marking engine.

18 Claims, 4 Drawing Sheets

U.S. PATENT DOCUMENTS

| | | | |
|---|---|---|---|
| 5,557,367 | A | 9/1996 | Yang et al. |
| 5,568,246 | A | 10/1996 | Keller et al. |
| 5,570,172 | A | 10/1996 | Acquaviva |
| 5,596,416 | A | 1/1997 | Barry et al. |
| 5,629,762 | A | 5/1997 | Mahoney et al. |
| 5,642,202 | A | 6/1997 | Williams |
| 5,710,874 | A | 1/1998 | Bergen |
| 5,710,968 | A | 1/1998 | Clark et al. |
| 5,778,377 | A | 7/1998 | Marlin et al. |
| 5,884,910 | A | 3/1999 | Mandel |
| 5,991,469 | A | 11/1999 | Johnson |
| 5,995,721 | A | 11/1999 | Rourke et al. |
| 6,059,284 | A | 5/2000 | Wolf et al. |
| 6,125,248 | A | 9/2000 | Moser |
| 6,241,242 | B1 | 6/2001 | Munro |
| 6,297,886 | B1 | 10/2001 | Cornell |
| 6,341,773 | B1 | 1/2002 | Aprato et al. |
| 6,384,918 | B1 | 5/2002 | Hubble, III et al. |
| 6,450,711 | B1 | 9/2002 | Conrow |
| 6,476,376 | B1 | 11/2002 | Biegelsen et al. |
| 6,476,923 | B1 | 11/2002 | Cornell |
| 6,493,098 | B1 | 12/2002 | Cornell |
| 6,537,910 | B1 | 3/2003 | Burke et al. |
| 6,550,762 | B2 | 4/2003 | Stoll |
| 6,554,276 | B2 | 4/2003 | Jackson et al. |
| 6,577,925 | B1 | 6/2003 | Fromherz |
| 6,607,320 | B2 | 8/2003 | Bobrow et al. |
| 6,608,988 | B2 | 8/2003 | Conrow |
| 6,612,566 | B2 | 9/2003 | Stoll |
| 6,612,571 | B2 | 9/2003 | Rider |
| 6,621,576 | B2 | 9/2003 | Tandon et al. |
| 6,633,382 | B2 | 10/2003 | Hubble, III et al. |
| 6,639,669 | B2 | 10/2003 | Hubble, III et al. |
| 6,654,143 | B1 | 11/2003 | Dalal et al. |
| 6,819,906 | B1 | 11/2004 | Herrmann et al. |
| 6,925,283 | B1 | 8/2005 | Mandel et al. |
| 6,959,165 | B2 | 10/2005 | Mandel et al. |
| 6,973,286 | B2 | 12/2005 | Mandel et al. |
| 7,014,374 | B2 | 3/2006 | Hamaguchi |
| 7,024,152 | B2 | 4/2006 | Lofthus et al. |
| 7,123,873 | B2 | 10/2006 | deJong et al. |
| 7,162,172 | B2 | 1/2007 | Grace et al. |
| 7,188,929 | B2 | 3/2007 | Lofthus et al. |
| 7,206,532 | B2 | 4/2007 | Lofthus et al. |
| 7,206,536 | B2 | 4/2007 | Julien |
| 7,224,913 | B2 | 5/2007 | Richards |
| 7,226,049 | B2 | 6/2007 | Lofthus et al. |
| 7,226,158 | B2 | 6/2007 | Moore et al. |
| 2002/0078012 | A1 | 6/2002 | Ryan et al. |
| 2002/0103559 | A1 | 8/2002 | Gartstein |
| 2003/0077095 | A1 | 4/2003 | Conrow |
| 2004/0085561 | A1 | 5/2004 | Fromherz |
| 2004/0085562 | A1 | 5/2004 | Fromherz |
| 2004/0088207 | A1 | 5/2004 | Fromherz |
| 2004/0150156 | A1 | 8/2004 | Fromherz et al. |
| 2004/0150158 | A1 | 8/2004 | Biegelsen et al. |
| 2004/0153983 | A1 | 8/2004 | McMillan |
| 2004/0216002 | A1 | 10/2004 | Fromherz et al. |
| 2004/0225391 | A1 | 11/2004 | Fromherz et al. |
| 2004/0225394 | A1 | 11/2004 | Fromherz et al. |
| 2004/0247365 | A1 | 12/2004 | Lofthus et al. |
| 2006/0066885 | A1 | 3/2006 | Anderson et al. |
| 2006/0067756 | A1 | 3/2006 | Anderson et al. |
| 2006/0067757 | A1 | 3/2006 | Anderson et al. |
| 2006/0114313 | A1 | 6/2006 | Moore |
| 2006/0114497 | A1 | 6/2006 | Anderson et al. |
| 2006/0115287 | A1 | 6/2006 | Roof |
| 2006/0115288 | A1 | 6/2006 | Roof |
| 2006/0132815 | A1 | 6/2006 | Lofthus et al. |
| 2006/0197966 | A1 | 9/2006 | Viturro et al. |
| 2006/0209101 | A1 | 9/2006 | Mizes |
| 2006/0214359 | A1 | 9/2006 | Clark |
| 2006/0214364 | A1 | 9/2006 | Clark et al. |
| 2006/0215240 | A1 | 9/2006 | Mongeon |
| 2006/0221159 | A1 | 10/2006 | Moore et al. |
| 2006/0221362 | A1 | 10/2006 | Julien et al. |
| 2006/0222384 | A1 | 10/2006 | Moore et al. |
| 2006/0222393 | A1 | 10/2006 | de Jong et al. |
| 2006/0227350 | A1 | 10/2006 | Crawford et al. |
| 2006/0230201 | A1 | 10/2006 | Fromherz et al. |
| 2006/0230403 | A1 | 10/2006 | Crawford et al. |
| 2006/0233569 | A1 | 10/2006 | Furst et al. |
| 2006/0235547 | A1 | 10/2006 | Hindi et al. |
| 2006/0238778 | A1 | 10/2006 | Mongeon et al. |
| 2006/0244980 | A1 | 11/2006 | Grace |
| 2006/0268317 | A1 | 11/2006 | Lofthus et al. |
| 2006/0268318 | A1 | 11/2006 | Lofthus et al. |
| 2006/0269310 | A1 | 11/2006 | German et al. |
| 2006/0274334 | A1 | 12/2006 | Mongeon |
| 2006/0274337 | A1 | 12/2006 | Dalal et al. |
| 2006/0280517 | A1 | 12/2006 | Roof et al. |
| 2006/0285159 | A1 | 12/2006 | Frankel |
| 2006/0285857 | A1 | 12/2006 | Swift |
| 2007/0002085 | A1 | 1/2007 | Sampath et al. |
| 2007/0002344 | A1 | 1/2007 | Klassen |
| 2007/0002403 | A1 | 1/2007 | Klassen |
| 2007/0024657 | A1* | 2/2007 | Zhang et al. .................. 347/19 |
| 2007/0024894 | A1 | 2/2007 | Moore et al. |
| 2007/0031170 | A1 | 2/2007 | deJong et al. |
| 2007/0041745 | A1 | 2/2007 | Dalal et al. |
| 2007/0052991 | A1 | 3/2007 | Goodman et al. |
| 2007/0081064 | A1 | 4/2007 | Spencer et al. |
| 2007/0081828 | A1 | 4/2007 | Radulski et al. |
| 2007/0110301 | A1 | 5/2007 | Wu et al. |
| 2007/0116479 | A1 | 5/2007 | Mandel et al. |

OTHER PUBLICATIONS

Desmond Fretz, "Cluster Printing Solution Announced", Today at Xerox (TAX), No. 1129, Aug. 3, 2001.
U.S. Appl. No. 10/881,619, filed Jun. 30, 2004, Bobrow.
U.S. Appl. No. 10/924,458, filed Aug. 23, 2004, Lofthus et al.
U.S. Appl. No. 10/924,459, filed Aug. 23, 2004, Mandel et al.
U.S. Appl. No. 10/933,556, filed Sep. 3, 2004, Spencer et al.
U.S. Appl. No. 10/953,953, filed Sep. 29, 2004, Radulski et al.
U.S. Appl. No. 10/999,450, filed Nov. 30, 2004, Lofthus et al.
U.S. Appl. No. 11/000,168, filed Nov. 30, 2004, Biegelsen et al.
U.S. Appl. No. 11/109,566, filed Apr. 19, 2005, Mandel et al.
U.S. Appl. No. 11/166,299, filed Jun. 24, 2005, Moore.
U.S. Appl. No. 11/166,460, filed Jun. 24, 2005, Roof et al.
U.S. Appl. No. 11/166,581, filed Jun. 24, 2005, Lang et al.
U.S. Appl. No. 11/215,791, filed Aug. 30, 2005, Hamby et al.
U.S. Appl. No. 11/234,468, filed Sep. 23, 2005, Hamby et al.
U.S. Appl. No. 11/234,553, filed Sep. 23, 2005, Mongeon.
U.S. Appl. No. 11/291,583, filed Nov. 30, 2005, Lang.
U.S. Appl. No. 11/291,860, filed Nov. 30, 2005, Willis.
U.S. Appl. No. 11/287,685, filed Nov. 28, 2005, Carolan.
U.S. Appl. No. 11/317,589, filed Dec. 23, 2005, Biegelsen et al.
U.S. Appl. No. 11/314,774, filed Dec. 21, 2005, Klassen.
U.S. Appl. No. 11/317,167, filed Dec. 23, 2005, Lofthus et al.
U.S. Appl. No. 11/314,828, filed Dec. 21, 2005, Anderson et al.
U.S. Appl. No. 11/292,388, filed Nov. 30, 2005, Mueller.
U.S. Appl. No. 11/292,163, filed Nov. 30, 2005, Mandel et al.
U.S. Appl. No. 11/312,081, filed Dec. 20, 2005, Mandel et al.
U.S. Appl. No. 11/331,627, filed Jan. 13, 2005, Moore.
U.S. Appl. No. 11/341,733, filed Jan. 27, 2006, German.
U.S. Appl. No. 11/359,065, filed Feb. 22, 2005, Banton.
U.S. Appl. No. 11/349,828, filed Feb. 8, 2006, Banton.
U.S. Appl. No. 11/364,685, filed Feb. 28, 2006, Hindi et al.
U.S. Appl. No. 11/363,378, filed Feb. 27, 2006, Anderson et al.
U.S. Appl. No. 11/378,046, filed Mar. 17, 2006, Rizzolo et al.
U.S. Appl. No. 11/378,040, filed Mar. 17, 2006, German.
U.S. Appl. No. 11/403,785, filed Apr. 13, 2006, Banton et al.
U.S. Appl. No. 11/399,100, filed Apr. 6, 2006, Paul.

U.S. Appl. No. 11/417,411, filed May 4, 2006, DeGruchy.
U.S. Appl. No. 11/432,924, filed May 12, 2006, Lieberman et al.
U.S. Appl. No. 11/432,905, filed May 12, 2006, Mongeon et al.
U.S. Appl. No. 11/432,993, filed May 12, 2006, Anderson.
U.S. Appl. No. 11/487,206, filed Jul. 14, 2006, Wu et al.
U.S. Appl. No. 11/485,870, filed Jul. 13, 2006, Moore.
U.S. Appl. No. 11/474,247, filed Jun. 23, 2006, Moore.
U.S. Appl. No. 11/483,747, filed Jul. 6, 2006, Meetze.
U.S. Appl. No. 11/495,017, filed Jul. 28, 2006, Bean.
U.S. Appl. No. 11/501,654, filed Aug. 9, 2006, Mestha et al.
U.S. Appl. No. 11/522,171, filed Sep. 15, 2006, Sampath et al.
U.S. Appl. No. 11/528,770, Sep. 27, 2006, Degruchy.
U.S. Appl. No. 11/595,630, Nov. 9, 2006, Moore.
U.S. Appl. No. 11/590,432, Oct. 31, 2006, Moore.
U.S. Appl. No. 11/636,747, Dec. 11, 2006, Mestha et al.
U.S. Appl. No. 11/636,901, Dec. 11, 2006, Banton et al.
U.S. Appl. No. 11/639,073, Dec. 14, 2006, Biegelsen et al.
U.S. Appl. No. 11/643,119, Dec. 21, 2006, Clark et al.
U.S. Appl. No. 11/656,992, Jan. 23, 2007, Sampath et al.
U.S. Appl. No. 11/708,298, Feb. 20, 2007, Lang.
U.S. Appl. No. 11/714,016, Mar. 5, 2007, Furst.
U.S. Appl. No. 11/787,777, Apr. 18, 2007, Costanza et al.

* cited by examiner

COLOR JOB OUTPUT MATCHING FOR A PRINTING SYSTEM

CROSS-REFERENCE TO RELATED APPLICATIONS

The following patents/applications, the disclosures of each being totally incorporated herein by reference are mentioned:

U.S. Publication No. US-2006-0114497-A1, Published Jun. 1, 2006, entitled "PRINTING SYSTEM," by David G. Anderson, et al., and claiming priority to U.S. Provisional Application Ser. No. 60/631,651, filed Nov. 30, 2004, entitled "TIGHTLY INTEGRATED PARALLEL PRINTING ARCHITECTURE MAKING USE OF COMBINED COLOR AND MONOCHROME ENGINES";

U.S. Publication No. US-2006-0067756-A1, filed Sep. 27, 2005, entitled "PRINTING SYSTEM," by David G. Anderson, et al., and claiming priority to U.S. Provisional Patent Application Ser. No. 60/631,918, filed Nov. 30, 2004, entitled "PRINTING SYSTEM WITH MULTIPLE OPERATIONS FOR FINAL APPEARANCE AND PERMANENCE," and U.S. Provisional Patent Application Ser. No. 60/631,921, filed Nov. 30, 2004, entitled "PRINTING SYSTEM WITH MULTIPLE OPERATIONS FOR FINAL APPEARANCE AND PERMANENCE";

U.S. Publication No. US-2006-0067757-A1, filed Sep. 27, 2005, entitled "PRINTING SYSTEM," by David G. Anderson, et al., and claiming priority to U.S. Provisional Patent Application Ser. No. 60/631,918, Filed Nov. 30, 2004, entitled "PRINTING SYSTEM WITH MULTIPLE OPERATIONS FOR FINAL APPEARANCE AND PERMANENCE," and U.S. Provisional Patent Application Ser. No. 60/631,921, filed Nov. 30, 2004, entitled "PRINTING SYSTEM WITH MULTIPLE OPERATIONS FOR FINAL APPEARANCE AND PERMANENCE";

U.S. Pat. No. 6,973,286, issued Dec. 6, 2005, entitled "HIGH RATE PRINT MERGING AND FINISHING SYSTEM FOR PARALLEL PRINTING," by Barry P. Mandel, et al.;

U.S. Pat. No. 7,226,049, Issued Jun. 5, 2007, entitled "UNIVERSAL FLEXIBLE PLURAL PRINTER TO PLURAL FINISHER SHEET INTEGRATION SYSTEM," by Robert M. Lofthus, et al.;

U.S. Application No. US-2006-0012102-A1, published Jan. 19, 2006, entitled "FLEXIBLE PAPER PATH USING MULTIDIRECTIONAL PATH MODULES," by Daniel G. Bobrow;

U.S. Pat. No. 7,206,532, Issued Apr. 17, 2007, entitled "MULTIPLE OBJECT SOURCES CONTROLLED AND/OR SELECTED BASED ON A COMMON SENSOR," by Robert M. Lofthus, et al.;

U.S. Pat. No. 7,188,929, Issued Mar. 13, 2007, entitled "PARALLEL PRINTING ARCHITECTURE CONSISTING OF CONTAINERIZED IMAGE MARKING ENGINES AND MEDIA FEEDER MODULES," by Robert M. Lofthus, et al.;

U.S. Pat. No. 7,924,152, issued Apr. 4, 2006, entitled "PRINTING SYSTEM WITH HORIZONTAL HIGHWAY AND SINGLE PASS DUPLEX," by Robert M. Lofthus, et al.;

U.S. Pat. No. 7,123,873, issued Oct. 17, 2006, entitled "PRINTING SYSTEM WITH INVERTER DISPOSED FOR MEDIA VELOCITY BUFFERING AND REGISTRATION," by Joannes N. M. deJong, et al.;

U.S. application Ser. No. 10/924,458, filed Aug. 23, 2004, entitled "PRINT SEQUENCE SCHEDULING FOR RELIABILITY," by Robert M. Lofthus, et al.;

U.S. Publication No. US-2006-0039729-A1, published Feb. 23, 2006, entitled "PARALLEL PRINTING ARCHITECTURE USING IMAGE MARKING ENGINE MODULES (as amended)," by Barry P. Mandel, et al.;

U.S. Pat. No. 6,959,165, issued Oct. 25, 2005, entitled "HIGH RATE PRINT MERGING AND FINISHING SYSTEM FOR PARALLEL PRINTING," by Barry P. Mandel, et al.;

U.S. application Ser. No. 10/933,556, filed Sep. 3, 2004, entitled "SUBSTRATE INVERTER SYSTEMS AND METHODS," by Stan A. Spencer, et al.;

U.S. application Ser. No. 10/953,953, filed Sep. 29, 2004, entitled "CUSTOMIZED SET POINT CONTROL FOR OUTPUT STABILITY IN A TIPP ARCHITECTURE," by Charles A. Radulski, et al.;

U.S. Pat. No. 7,162,172, Issued Jan. 9, 2007, entitled "SEMI-AUTOMATIC IMAGE QUALITY ADJUSTMENT FOR MULTIPLE MARKING ENGINE SYSTEMS," by Robert E. Grace, et al.;

U.S. application Ser. No. 10/999,450, filed Nov. 30, 2004, entitled "ADDRESSABLE FUSING FOR AN INTEGRATED PRINTING SYSTEM," by Robert M. Lofthus, et al.;

U.S. Publication No. US-2006-0115287-A1, Published Jun. 1, 2006, entitled "GLOSSING SYSTEM FOR USE IN A TIPP ARCHITECTURE," by Bryan J. Roof;

U.S. application Ser. No. 11/000,168, filed Nov. 30, 2004, entitled "ADDRESSABLE FUSING AND HEATING METHODS AND APPARATUS," by David K. Biegelsen, et al.;

U.S. Publication No. US-2006-0115288-A1, Published Jun. 1, 2006, entitled "GLOSSING SYSTEM FOR USE IN A TIPP ARCHITECTURE," by Bryan J. Roof;

U.S. Pat. No. 6,925,283, issued Aug. 2, 2005, entitled "HIGH PRINT RATE MERGING AND FINISHING SYSTEM FOR PARALLEL PRINTING," by Barry P. Mandel, et al.;

U.S. Pat. No. 7,226,158, Issued Jun. 5, 2007, entitled "PRINTING SYSTEMS," by Steven R. Moore, et al.;

U.S. Publication No. US-2006-0132815-A1, Published Jun. 22, 2006, entitled "PRINTING SYSTEMS," by Robert M. Lofthus, et al.;

U.S. Publication No. US-2006-0197966-A1, Published Sep. 7, 2006, entitled "GRAY BALANCE FOR A PRINTING SYSTEM OF MULTIPLE MARKING ENGINES," by R. Enrique Viturro, et al.;

U.S. Publication No. US-2006-0114313-A1, Published Jun. 1, 2006, entitled "PRINTING SYSTEM," by Steven R. Moore;

U.S. Publication No. US-2006-0209101-A1, Published Sep. 21, 2006, entitled "SYSTEMS AND METHODS FOR MEASURING UNIFORMITY IN IMAGES," by Howard Mizes;

U.S. Publication No. US-2006-0214364-A1, Published Sep. 28, 2006, entitled "SHEET REGISTRATION WITHIN A MEDIA INVERTER," by Robert A. Clark, et al.;

U.S. Publication No. US-2006-0214359-A1, Published Sep. 28, 2006, entitled "INVERTER WITH RETURN/BYPASS PAPER PATH," by Robert A. Clark;

U.S. Publication No. 20031468-US-NP, Published Sep. 28, 2006, entitled IMAGE QUALITY CONTROL METHOD AND APPARATUS FOR MULTIPLE MARKING ENGINE SYSTEMS," by Michael C. Mongeon;

U.S. Pat. No. 7,206,536, Issued Apr. 17, 2007, entitled "PRINTING SYSTEM," by Paul C. Julien;

U.S. Publication No. US-2006-0221362-A1, Published Oct. 5, 2006, entitled "PRINTING SYSTEM," by Paul C. Julien;

U.S. Publication No. US-2006-0222393-A1, Published Oct. 5, 2006, entitled "PRINTING SYSTEM," by Jeremy C. deJong, et al.;

U.S. Publication No. US-2006-0222384-A1, Published Oct. 5, 2006, entitled "IMAGE ON PAPER REGISTRATION ALIGNMENT," by Steven R. Moore, et al.;

U.S. Publication No. US-2006-0221159-A1, Published Oct. 5, 2006, entitled "PARALLEL PRINTING ARCHITECTURE WITH PARALLEL HORIZONTAL PRINTING MODULES," by Steven R. Moore, et al.;

U.S. Publication No. US-2006-0227350-A1, Published Oct. 12, 2006, entitled "SYNCHRONIZATION IN A DISTRIBUTED SYSTEM," by Lara S. Crawford, et al.;

U.S. Publication No. US-2006-0230403-A1, Published Oct. 12, 2006, entitled "COORDINATION IN A DISTRIBUTED SYSTEM," by Lara S. Crawford, et al.;

U.S. Publication No. US-2006-0230201-A1, Published Oct. 12, 2006, entitled "COMMUNICATION IN A DISTRIBUTED SYSTEM," by Markus P. J. Fromherz, et al.;

U.S. Publication No. US-2006-0235547-A1, published Oct. 19, 2006, entitled "ON-THE-FLY STATE SYNCHRONIZATION IN A DISTRIBUTED SYSTEM," by Haitham A. Hindi;

U.S. Publication No. US-2006-0233569-A1, filed Oct. 19, 2006, entitled "SYSTEMS AND METHODS FOR REDUCING IMAGE REGISTRATION ERRORS," by Michael R. Furst, et al.;

U.S. application Ser. No. 11/109,566, filed Apr. 19, 2005, entitled "MEDIA TRANSPORT SYSTEM," by Barry P. Mandel, et al.;

U.S. Publication No. US-2006-0238778-A1, Published Oct. 26, 2006, entitled "PRINTING SYSTEMS," by Michael C. Mongeon, et al.;

U.S. Publication No. US-2006-0244980-A1, Filed Apr. 27, 2005, entitled "IMAGE QUALITY ADJUSTMENT METHOD AND SYSTEM," by Robert E. Grace;

U.S. Pat. No. 7,224,913, Issued May 29, 2007, entitled "PRINTING SYSTEM AND SCHEDULING METHOD," by Austin L. Richards;

U.S. Publication No. US-2006-0269310-A1, Published Nov. 30, 2006, entitled "PRINTING SYSTEMS," by Kristine A. German, et al.;

U.S. Publication No. US-2006-0268318-A1, Published Nov. 30, 2006, entitled "PRINTING SYSTEM," by Robert M. Lofthus, et al.;

U.S. Publication No. US-2006-0268317-A1, Published Nov. 30, 2006, entitled "SCHEDULING SYSTEM," by Robert M. Lofthus, et al.;

U.S. Publication No. US-2006-0066885-A1, filed May 25, 2005, entitled "PRINTING SYSTEM," by David G. Anderson, et al.;

U.S. Publication No. US-2006-0274337-A1, Published Dec. 7, 2006, entitled "INTER-SEPARATION DECORRELATOR," by Edul N. Dalal, et al.;

U.S. Publication No. US-2006-0274334-A1, Published Dec. 7, 2006, entitled "LOW COST ADJUSTMENT METHOD FOR PRINTING SYSTEMS," by Michael C. Mongeon;

U.S. Publication No. US-2006-0280517-A1, Published Dec. 14, 206, entitled "WARM-UP OF MULTIPLE INTEGRATED MARKING ENGINES," by Bryan J. Roof, et al.;

U.S. Publication No. US-2006-0285857-A1, Published Dec. 21, 2006, entitled "PRINTING PLATFORM," by Joseph A. Swift;

U.S. Publication No. US-2006-0285159-A1, Published Dec. 21, 2006, entitled "METHOD OF ORDERING JOB QUEUE OF MARKING SYSTEMS," by Neil A. Frankel;

U.S. Publication No. US-2006-0291927-A1, Published Dec. 28, 2006, entitled "GLOSSING SUBSYSTEM FOR A PRINTING DEVICE," by Bryan J. Roof, et al.;

U.S. Publication No. US-2006-0291018-A1, Published Dec. 28, 2006, entitled "MIXED OUTPUT PRINT CONTROL METHOD AND SYSTEM," by Joseph H. Lang, et al.;

U.S. application Ser. No. 11/166,299, filed Jun. 24, 2005, entitled "PRINTING SYSTEM," by Steven R. Moore;

U.S. Publication No. US-2007-0002403-A1, Published Jan. 4, 2007, entitled "METHOD AND SYSTEM FOR PROCESSING SCANNED PATCHES FOR USE IN IMAGING DEVICE CALIBRATION," by R. Victor Klassen;

U.S. Publication No. US-2007-0002344-A1, Published Jan. 4, 2007, entitled "COLOR CHARACTERIZATION OR CALIBRATION TARGETS WITH NOISE-DEPENDENT PATCH SIZE OR NUMBER," by R. Victor Klassen;

U.S. Publication No. US-2007-0002085-A1, Published Jan. 4, 2007 entitled "HIGH AVAILABILITY PRINTING SYSTEMS," by Meera Sampath, et al.;

U.S. Publication No. US-2007-0024894-A1, Published Feb. 1, 2007, entitled "PRINTING SYSTEM," by Steven R. Moore, et al.;

U.S. Publication No. US-2007-0041745-A1, Published Feb. 22, 2007, entitled "MODULAR MARKING ARCHITECTURE FOR WIDE MEDIA PRINTING PLATFORM," by Edul N. Dalal, et al.;

U.S. application Ser. No. 11/215,791, filed Aug. 30, 2005, entitled "CONSUMABLE SELECTION IN A PRINTING SYSTEM," by Eric Hamby, et al.;

U.S. Application Publication No. US-2007-0052991-A1, Published Mar. 8, 2007, entitled "METHOD AND SYSTEMS FOR DETERMINING BANDING COMPENSATION PARAMETERS IN PRINTING SYSTEMS," by Goodman, et al.;

U.S. application Ser. No. 11/234,553, filed Sep. 23, 2005, entitled "MAXIMUM GAMUT STRATEGY FOR THE PRINTING SYSTEMS," by Michael C. Mongeon;

U.S. application Ser. No. 11/234,468, filed Sep. 23, 2005, entitled "PRINTING SYSTEM," by Eric Hamby, et al.;

U.S. Publication No. US-2007-0081828-A1, Published Apr. 12, 2007, entitled "PRINTING SYSTEM WITH BALANCED CONSUMABLE USAGE," by Charles Radulski, et al.;

U.S. Publication No. US-2007-0081064-A1, Published Apr. 12, 2007, entitled "MEDIA PATH CROSSOVER FOR PRINTING SYSTEM," by Stan A. Spencer, et al.; and U.S. Publication No. US-2007-0110301-A1, published May 17, 2007, entitled "GAMUT SELECTION IN MULTI-ENGINE SYSTEMS," by Wencheng Wu, et al.;

U.S. Publication No. US-2007-0116479-A1, published May 24, 2007, entitled "MEDIA PASS THROUGH MODE FOR MULTI-ENGINE SYSTEM," by Barry P. Mandel, et al.;

U.S. application Ser. No. 11/287,685, filed Nov. 28, 2005, entitled "MULTIPLE IOT PPHOTORECEPTOR BELT SEAM SYNCHRONIZATION," by Kevin M. Carolan;

U.S. application Ser. No. 11/291,860, filed Nov. 30, 2005, entitled "MEDIA PATH CROSSOVER CLEARANCE FOR PRINTING SYSTEM," by Keith L. Willis;

U.S. application Ser. No. 11/292,388, filed Nov. 30, 2005, entitled "PRINTING SYSTEM," by David A. Mueller;

U.S. application Ser. No. 11/292,163, filed Nov. 30, 2005, entitled "RADIAL MERGE MODULE FOR PRINTING SYSTEM," by Barry P. Mandel, et al.;

U.S. application Ser. No. 11/291,583, filed Nov. 30, 2005, entitled "MIXED OUTPUT PRINTING SYSTEM," by Joseph H. Lang;

U.S. application Ser. No. 11/312,081, filed Dec. 20, 2005, entitled "PRINTING SYSTEM ARCHITECTURE WITH CENTER CROSS-OVER AND INTERPOSER BY-PASS PATH," by Barry P. Mandel, et al.;

U.S. application Ser. No. 11/314,828, filed Dec. 21, 2005, entitled "MEDIA PATH DIAGNOSTICS WITH HYPER MODULE ELEMENTS," by David G. Anderson, et al;

U.S. application Ser. No. 11/314,774, filed Dec. 21, 2005, entitled "METHOD AND APPARATUS FOR MULTIPLE PRINTER CALIBRATION USING COMPROMISE AIM," by R. Victor Klassen;

U.S. application Ser. No. 11/317,589, filed Dec. 23, 2005, entitled "UNIVERSAL VARIABLE PITCH INTERFACE INTERCONNECTING FIXED PITCH SHEET PROCESSING MACHINES," by David K. Biegelsen, et al.;

U.S. application Ser. No. 11/317,167, filed Dec. 23, 2005, entitled "PRINTING SYSTEM," by Robert M. Lofthus, et al.;

U.S. application Ser. No. 11/331,627, filed Jan. 13, 2006, entitled "PRINTING SYSTEM INVERTER APPARATUS", by Steven R. Moore;

U.S. application Ser. No. 11/341,733, filed Jan. 27, 2006, entitled "PRINTING SYSTEM AND BOTTLENECK OBVIATION", by Kristine A. German;

U.S. application Ser. No. 11/349,828, filed Feb. 8, 2005, entitled "MULTI-DEVELOPMENT SYSTEM PRINT ENGINE", by Martin E. Banton;

U.S. application Ser. No. 11/359,065, filed Feb. 22, 2005, entitled "MULTI-MARKING ENGINE PRINTING PLATFORM", by Martin E. Banton;

U.S. application Ser. No. 11/363,378, filed Feb. 27, 2006, entitled "SYSTEM FOR MASKING PRINT DEFECTS", by Anderson, et al.;

U.S. application Ser. No. 11/364,685, filed Feb. 28, 2006, entitled "SYSTEM AND METHOD FOR MANUFACTURING SYSTEM DESIGN AND SHOP SCHEDULING USING NETWORK FLOW MODELING", by Hindi, et al.;

U.S. application Ser. No. 11/378,046, filed Mar. 17, 2006, entitled "PAGE SCHEDULING FOR PRINTING ARCHITECTURES", by Charles D. Rizzolo, et al.;

U.S. application Ser. No. 11/378,040, filed Mar. 17, 2006, entitled "FAULT ISOLATION OF VISIBLE DEFECTS WITH MANUAL MODULE SHUTDOWN OPTIONS", by Kristine A. German, et al.;

U.S. application Ser. No. 11/399,100, filed Apr. 6, 2006, entitled "SYSTEMS AND METHODS TO MEASURE BANDING PRINT DEFECTS", by Peter Paul;

U.S. application Ser. No. 11/403,785, filed Apr. 13, 2006, entitled "MARKING ENGINE SELECTION", by Martin E. Banton et al.;

U.S. application Ser. No. 11/417,411, filed May 4, 2006, entitled "DIVERTER ASSEMBLY, PRINTING SYSTEM AND METHOD", by Paul J. Degruchy;

U.S. application Ser. No. 11/432,993, filed May 12, 2006, entitled "TONER SUPPLY ARRANGEMENT", by David G. Anderson;

U.S. application Ser. No. 11/432,924, filed May 12, 2006, entitled "AUTOMATIC IMAGE QUALITY CONTROL OF MARKING PROCESSES", by David J. Lieberman;

U.S. application Ser. No. 11/432,905, filed May 12, 2006, entitled "PROCESS CONTROLS METHODS AND APPARATUSES FOR IMPROVED IMAGE CONSISTENCY", by Michael C. Mongeon et al.;

U.S. application Ser. No. 11/474,247, filed Jun. 23, 2006, entitled "CONTINUOUS FEED PRINTING SYSTEM", by Steven R. Moore;

U.S. application Ser. No. 11/483,747, filed Jul. 6, 2006, entitled "POWER REGULATOR OF MULTIPLE MARKING ENGINES", by Murray O. Meetze, Jr.;

U.S. application Ser. No. 11/485,870, filed Jul. 13, 2006, entitled "PARALLEL PRINTING SYSTEM", by Steven R. Moore;

U.S. application Ser. No. 11/487,206, filed Jul. 14, 2006, entitled "BANDING AND STREAK DETECTION USING CUSTOMER DOCUMENTS", by Wencheng Wu, et al.;

U.S. application Ser. No. 11/495,017, filed Jul. 28, 2006, entitled "SYSTEM AND METHOD FOR PARTIAL JOB INTERRUPT OF NORMAL ORDER OF JOB QUEUE OF MARKING SYSTEMS", by Lloyd F. Bean, II;

U.S. application Ser. No. 11/501,654, filed Aug. 9, 2006, entitled "METHOD FOR SPATIAL COLOR CALIBRATION USING HYBRID SENSING SYSTEMS", by Lalit Keshav Mestha et al.;

U.S. application Ser. No. 11/522,171, filed Sep. 15, 2006, entitled "FAULT MANAGEMENT FOR A PRINTING SYSTEM", by Meera Sampath, et al.;

U.S. application Ser. No. 11/528,770, filed Sep. 27, 2006, entitled "SHEET BUFFERING SYSTEM", by Paul DeGruchy;

U.S. Publication No. A3190-US-NP, Published Feb. 8, 2007, entitled "PRINTING SYSTEM WITH INVERTER DISPOSED FOR MEDIA VELOCITY BUFFERING AND REGISTRATION", by Joannes N. M. Dejong et al.

U.S. application Ser. No. 11/590,432, filed Oct. 31, 2006, entitled "SHAFT DRIVING APPARATUS", by Steven R. Moore;

U.S. application Ser. No. 11/595,630, filed Nov. 9, 2006, entitled "PRINT MEDIA ROTARY TRANSPORT APPARATUS AND METHOD", by Steven R. Moore;

U.S. application Ser. No. 11/636,901, filed Dec. 11, 2006, entitled "DATA BINDING IN MULTIPLE MARKING ENGINE PRINTING SYSTEMS BACKGROUND", by Martin E. Banton et al.;

U.S. application Ser. No. 11/636,747, filed Dec. 11, 2006, entitled "METHOD AND SYSTEM FOR IDENTIFYING OPTIMAL MEDIA FOR CALIBRATION AND CONTROL", by Lalit Keshav Mestha et al.;

U.S. application Ser. No. 11/639,073, filed Dec. 14, 2006, entitled "MODULE IDENTIFICATION METHOD AND SYSTEM FOR PATH CONNECTIVITY IN MODULAR SYSTEMS", by David K. Biegelsen et al.;

U.S. application Ser. No. 11/612,908, filed Dec. 19, 2006, entitled "EXCEPTION HANDLING", by Wheller Ruml et al.;

U.S. application Ser. No. 11/642,028, filed Dec. 19, 2006, entitled "BI-DIRECTIONAL MEDIA SHEET TRANSPORT APPARATUS", by James J. Spence et al.;

U.S. application Ser. No. 11/643,119, filed Dec. 21, 2006, entitled "MEDIA FEEDER FEED RATE", by Robert A. Clark et al.;

U.S. application Ser. No. 11/656,992, filed Jan. 23, 2007, entitled "PREEMPTIVE REDIRECTION IN PRINTING SYSTEMS", by Meera Sampath et al.;

U.S. application Ser. No. 11/708,298, filed Feb. 20, 2007, entitled "EFFICIENT CROSS-STREAM PRINTING SYSTEM", by Joseph H. Lang;

U.S. application Ser. No. 11/714,016, filed Mar. 5, 2007, entitled "METHOD OF DUPLEX PRINTING ON SHEET MEDIA", by Michael R. Furst;

U.S. application Ser. No. 11/787,777, filed Apr. 18, 2007, entitled "METHOD OF CONTROLLING AUTOMATIC ELECTROSTATIC MEDIA SHEET PRINTING", by Daniel W. Costanza et al.;

U.S. application Ser. No. 11/796,910, filed Apr. 30, 2007, entitled "SCHEDULING SYSTEM", by Brougham et al.;

U.S. application Ser. No. 11/801,231, filed May 9, 2007, entitled "REGISTRATION METHOD USING SENSED IMAGE MARKS AND DIGITAL REALIGNMENT", by Shen-Ge Wang et al.:

U.S. application Ser. No. 11/807,472, filed May 29, 2007, entitled "SYSTEM AND METHOD FOR ON-LINE PLANNING UTILIZING MULTIPLE PLANNING QUEUES", by Wheeler Ruml et al.;

U.S. application Ser. No. 11/807,473, filed May 29, 2007, entitled "MODEL-BASED PLANNING WITH MULTI-CAPACITY RESOURCES", by Minh Binh et al.;

U.S. application Ser. No. 11/807,475, filed May 29, 2007, entitled "SYSTEM AND METHOD FOR REAL-TIME SYSTEM CONTROL USING PRECOMPUTED PLANS", by Wheeler Ruml et al.;

U.S. application Ser. No. 11/807,478, filed May 29, 2007, entitled "MODEL-BASED PLANNING USING QUERY-BASED COMPONENT EXECUTABLE INSTRUCTIONS", by Wheeler Ruml et al.;

U.S. application Ser. No. 11/888,601, filed Aug. 1, 2007, entitled "COLOR JOB REPRINT SET-UP FOR A PRINTING by Daniel M. Bray et al.;

BACKGROUND

In a color xerographic printing system that comprises multiple xerographic engines or image marking engines, a problem of color consistency and color matching can arise between individual image marking engines of an integrated system and/or between the same image marking engine from one print job relative to another subsequent print job. The present disclosure is directed to a method and system for maintaining color consistency and color matching of each engine's output. The present disclosure provides an efficient system and method for providing color accuracy and/or color consistency for a single print job and/or from one print job to another print job utilizing multiple image marking engines while minimizing media consumption.

BRIEF SUMMARY

A printing system is provided for color job matching of the output from a plurality of image marking engines. The system includes a first test image printed by a first image marking engine on a media document. The first test image having a data glyph and a plurality of reference patches. The system further includes a second test image printed by a second image marking engine on the media document. The second test image having a data glyph and a plurality of reference patches. The first and second test images are printed on the same side of the media document. A scanner is provided for scanning the media document. The scanned first and second test images provide calibration data for matching color correction tables of the first image marking engine and the second image marking engine, wherein the data glyph and the reference patches of the scanned image data are compared with retrieved color correction tables for generating compensation values based on a difference between the scanned image set-up data and the color correction tables for at least a first subsequent image document on the first image marking engine or the second image marking engine.

The present disclosure further provides for a printing system for color job matching comprising a plurality of image marking engines wherein a color calibration image is printed by each of the plurality of image marking engines. The plurality of color calibration images are printed on a same side of a media document wherein each of the color calibration images are positioned on the media document to maximize the number of color calibration images printed on the same side of the media document. The plurality of color calibration images are scanned by a calibrated color spectrophotometer and each of the plurality of image marking engines are corrected for adherence to operating set points.

Further in accordance with the present disclosure, a method is provided for color job matching in a printing system. The method comprises printing a first color calibration image from a first image marking engine on a media sheet and then moving the media sheet to a second image marking engine and printing a second color calibration image on a same side of the media sheet. The steps above can be repeated until all the image marking engines in the printing system have printed a color calibration image on the media sheet or until the media sheet can no longer accommodate another color calibration image. Each of the color calibration images can have a data glyph and a plurality of reference patches wherein the data glyph records distinct job attributes and the reference patches record color values of the respective color calibration images. The method further comprises scanning the color calibration images and compensating the reference patches for repeated reimaging. And further generating set-up data from the data glyph and the reference patches, the set-up data includes information for calibrating and updating color correction tables and actual set-up targets for each of the image marking engines.

BRIEF DESCRIPTION OF THE DRAWINGS

The following is a brief description of each drawing used to describe the present disclosure, and thus, are being presented for illustrative purposes only and should not be limitative of the scope of the present disclosure, wherein.

DETAILED DESCRIPTION OF THE EXEMPLARY EMBODIMENTS

In many areas of copier/printer/scanner image quality testing, it is desirable to start with a known test or master, process it through the machine under test, and analyze the resulting image. Based on the results of this analysis, the machine under test, can be adjusted, calibrated, or compensated via various control points. For example, if a halftone pattern is being reproduced on a laser printer, the resulting reflectance of the electronically generated halftone can change from printer to printer or overtime for the same printer. If the output from a printer is digitized via a scanner or image capture device, the printer's response to an applied halftone can be measured and compensated for by modifying parameters within the halftoning process such as the tone reproduction curve. Thus, by applying a known input, and measuring the error between the desired output and the actual output, a matrix of correction terms can be derived to obtain the desired output from the machine.

Figure 1:
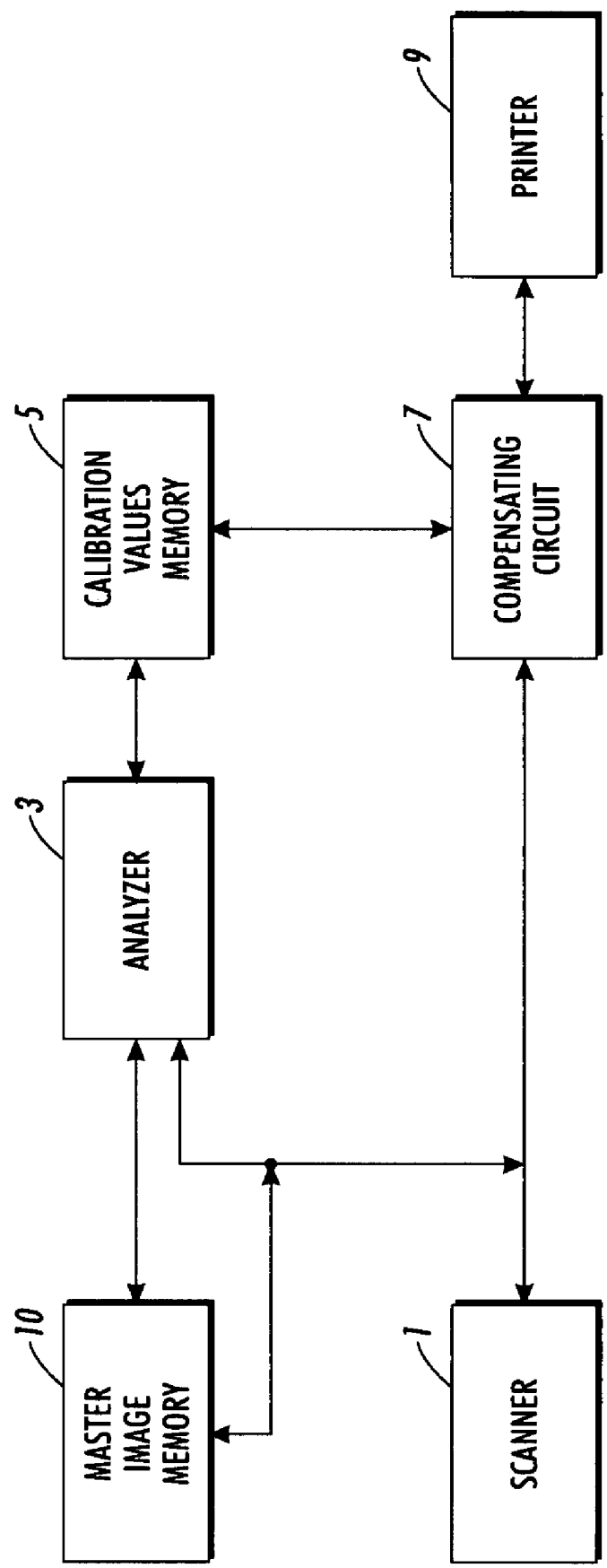
FIG. 1 shows a block diagram illustrating a conventional calibration system.

FIG. 1 illustrates a conventional system used to calibrate a monochrome printer. A scanner or image capture device 1 scans in a master or target image having a predetermined set of test patches. This master image is stored in a master image memory 10. When calibrating the printer, the stored master image is fed to a printer 9 via a compensating circuit 7 which allows the master image to pass therethrough without processing. The printer 9 prints the master image on a recording medium which is fed back into the scanner 1. The scanned in image is fed to an analyzer 3 which compares the image data values of the scanned in image with the master image data values fed from the master image memory 10. The analyzer 3 determines the errors or differences between the two images and produces calibration values therefrom which are stored as a new screen matrix in a calibration values memory 5. The calibration values are used by compensating circuit 7 to correct image data subsequently sent to the printer 9 so that the image is reproduced accurately.

The calibration technique described with respect to FIG. 1 can also be extended to calibrate color printers. However, due to the increase in number of output attributes, calibration in the color domain is more complex. In addition, the calibration technique can be extended to line width/growth image quality diagnostics, photoreceptor deletions, etc.

The aforementioned calibration technique includes scanning the image produced by each of the image marking engines, processing and adjusting color parameters, and repeating the steps until the engine is within a predetermined window of acceptability. The level of acceptability can be such that the color output of each engine is calibrated in order that the system generated output appears uniform. This calibration process may need to be run once every 500 to 1000 prints and/or at every cycle-up for each engine. If a separate media sheet is used for each calibration, the amount of media consumed, along with the associated scan/process time, can become objectionable to the user.

In multiple xerographic engine configurations it is desirable to minimize engine to engine differences in rendering color image outputs. Architectures have been proposed that place a scanner at the system output and, on the basis of measurements made of printed calibration targets, corrections are applied to minimize the color differences among the constituent engines. As discussed above, for a larger number of engines, this approach can consume an unacceptable amount of customer media. To minimize waste, one embodiment of the present disclosure provides for rendering all the calibration reference patches in an arrangement such that all the reference patches are printed on a single media sheet that has been routed to all, or several, of the image marking engines. This process reduces the scan time and resource requirements of printing each reference patch on its own individual sheet. Alternatively, if there are more reference patches (i.e. image marking engines) than can be placed on a single media sheet, then a 'rolling schedule' can be utilized and a subset(s) of available marking engines can print their respective reference patches. Additionally, and also alternatively, all the engines can print their respective reference patches on a determined minimum number of media sheets. As one example, if there are fourteen (14) image marking engines in the printing system and six (6) reference patches can be printed per individual media sheet, then a minimum of three (3) media sheets (one w/6 patches, one w/6 patches, and one w/2 patches) can be printed which would include all of the reference patches. The reference patches can also be oriented/positioned prior to printing on the media sheet in order to maximize the total number of reference patches included on each individual media sheet (refer to FIG. 4).

It is to be appreciated that multiple imaging and fusing of the same media sheet as it passes from one image marking engine to another image marking engine can result in appearance changes. Compensation factors can be applied to the reference patches such that any appearance change due to multiple imaging and fusing can be accommodated without affecting the measurement of the printed calibration targets.

The color scanner itself can be properly calibrated since most scanners are not calorimetric. The conventional scanner calibration is done by scanning a color test pattern with the scanner. The scanner R, G, B readings are then correlated with the CIE/XYZ values of reference patches measured with a colorimeter. Grey patches in the test pattern can be used to establish the relationship between the scanner R, G, and B values and the luminance intensity L. The L equivalent scanned R, G, and B values are then multiplied by a 3×3 matrix to yield the X, Y, and Z values. The matrix of correction coefficients are determined by regression analysis to minimize the difference between the measured and calculated X, Y, and Z values. With the scanner calibrated, the device dependent scanner R, G, and B values can then be related to the device independent standard measures, such as the CIE/XYZ values.

Once the scanner is calibrated, the image marking engines or printers can then be calibrated. There are several methods of performing color printer output calibrations, such calibrations can be classified as algorithmic, table look-up, or a hybrid approach.

In calibrating the color printers, conventionally, a printed test image is scanned by a calibrated scanner. A resulting 24 bit image in LAB space (30 bits in RGB space) is then analyzed (ten bits per RGB color scan), and the average scan patch RGB values are determined and converted to device independent data. The device independent data can then be processed to convert the data into $L^*C^*h^*$ space. Interpolated RGB levels corresponding to a minimum chroma can then be the basis of a set of grey balance screens or a set of new seed RGB values for a new test pattern generation, if further iteration is required.

Another step in the color calibration is to determine the color correction matrix or matrices that will enable a match between the input and output colors. Initially, color seed data is utilized to print multiple 3×9 matrices of color patches. The colors in each matrix correspond to all the possible combinations of increasing and decreasing RGB values by a fixed amount around a center value targeted towards a selected set of colors. The pattern is then printed on the color printer to be calibrated.

The printed patterns are then scanned with the scanner RGB values of the patches being converted to the CIE/$L^*a^*b^*$ and the color difference between the printed patches and the corresponding test target are computed. The RGB values of the patch with the minimum color difference are then used as color seed data in the next iteration. Upon obtaining a set of modified RGB values that have a small enough color difference, a multiple linear regression analysis is performed to determine the matrix needed to transform the input RGB to the modified RGB. One way of conventionally transforming the input to the modified RGB is utilizing a process which weights each term by the sum of the squares of partial differentials of $L^*$, $a^*$, and $b^*$ with respect to R, G, and B values evaluated at the target RGB points. Once the transformation is established between the input RGB to the modified RGB, these values can be utilized to calibrate the color printer.

In a color xerographic printer that employs multiple xerographic engines or multiple image marking engines, the problem of color consistency and color matching between engines can be addressed by placing a scanner or image capture device in the output path and printing "calibration" prints on each engine. As described above, the calibration prints can then be used to correct or match each engines output.

Figure 2:
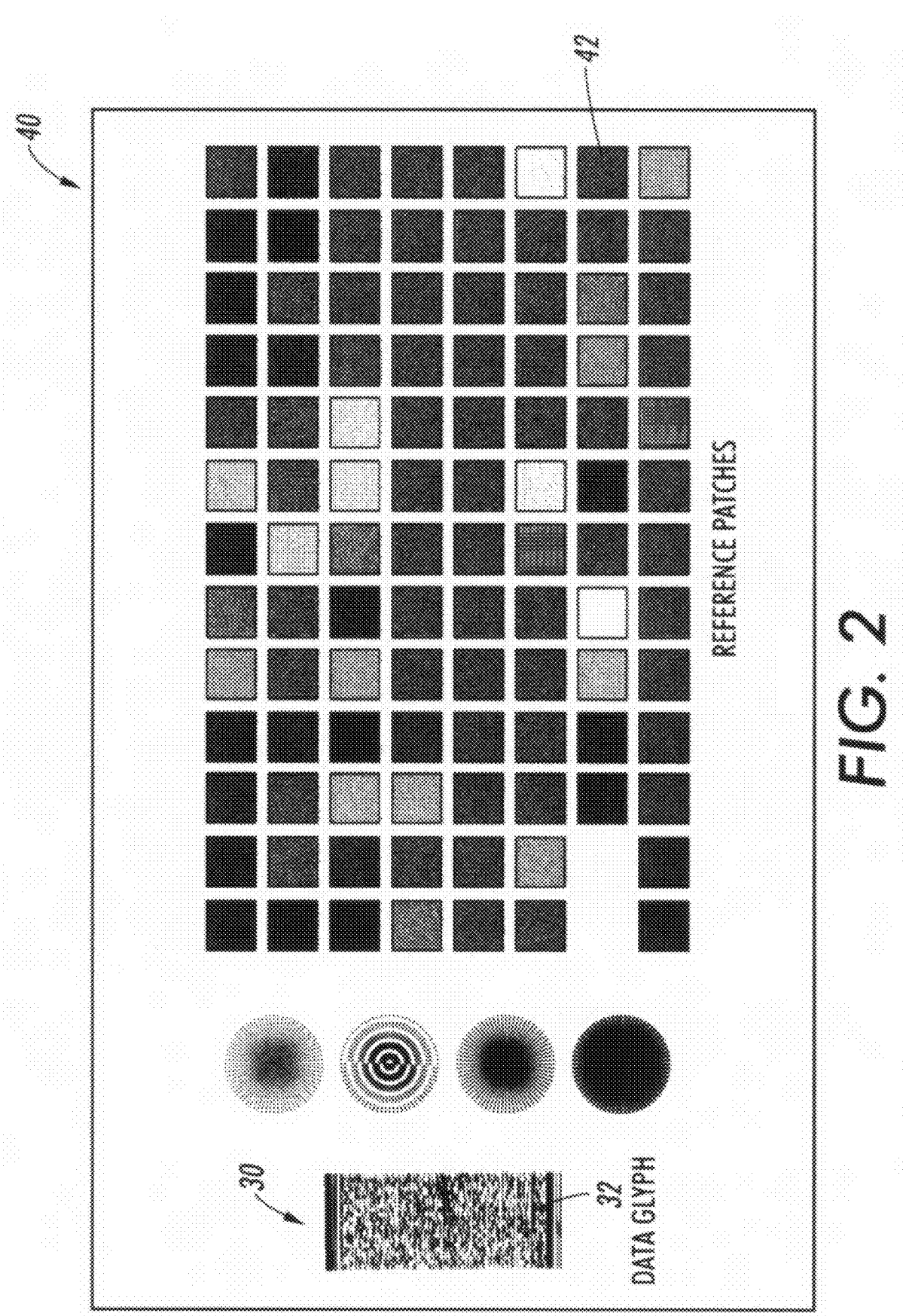
FIG. 2 shows an example of a calibration image output displaying a data glyph and a series of reference patches associated with an individual image marking engine.

To facilitate subsequent job reprints and/or output matching, and more particularly, efficient and consistent job prints having matching output, the following is provided. Once the print system is set-up and producing acceptable output, the operator can request a job "quick set" print that would be kept for future reprints or output matching. When a job reprint is desired, the "quick set" reference print would be scanned. The reference print would provide all the information needed to allow the print system to converge on the previous color values, image settings, and other job attributes necessary to quickly complete the reprint request. This "quick set" print can contain color reference patches, and a data glyph on a single side of one page (i.e. FIGS. 2 and 3). The reference patches provide information to calculate and update the color correction tables and actual set-up targets. The data glyph can contain xerographic, image path, and other important settings.

Figure 3:
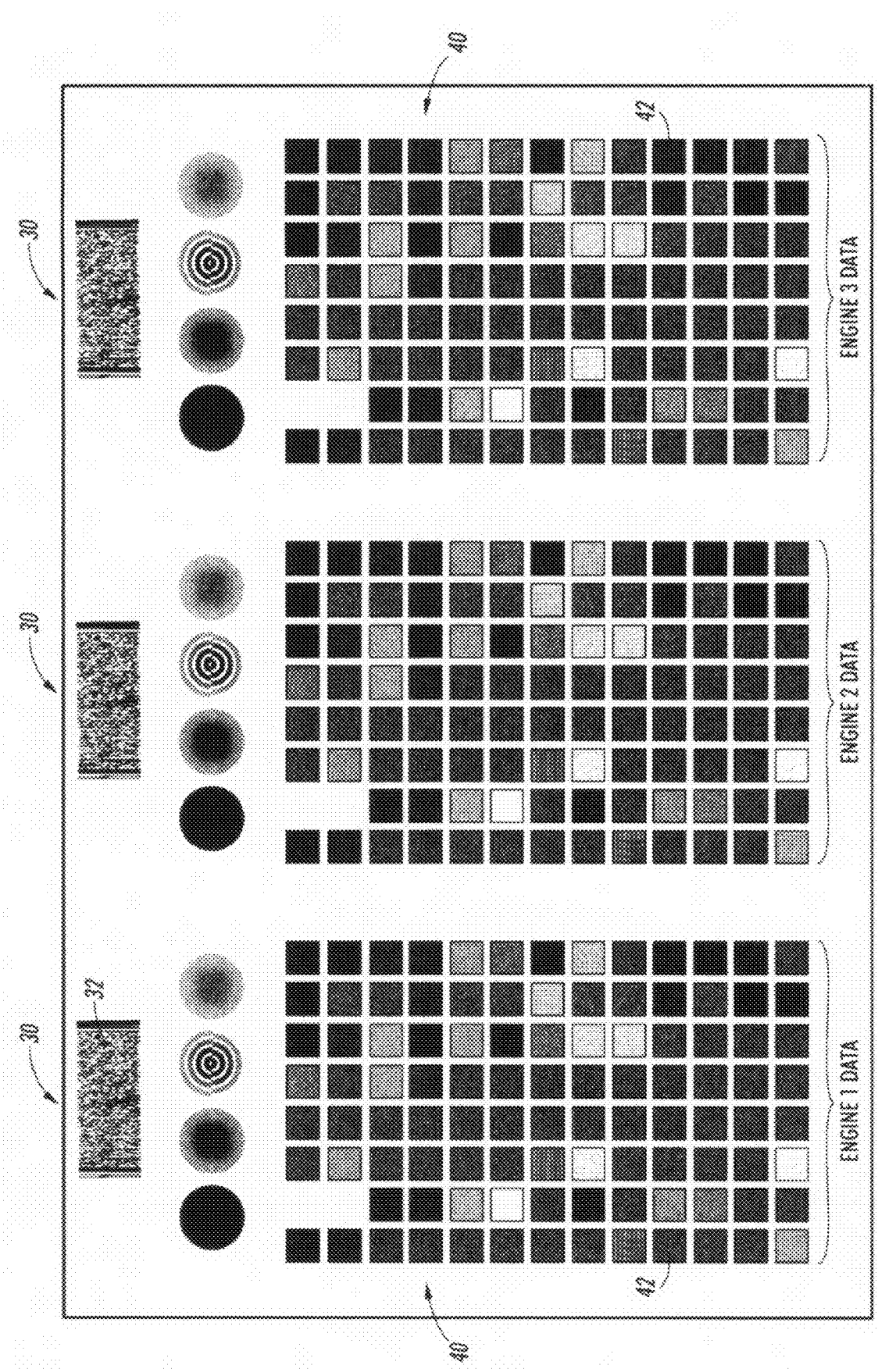
FIG. 3 shows a plurality of color calibration images on a single page displaying a data glyph and a reference patch for each one of a plurality of image marking engines; and, FIG. 4 shows six color calibration images arranged to 'fit' on a single media sheet displaying a data glyph and a reference patch for each one of the associated image marking engines.
Figure 4:
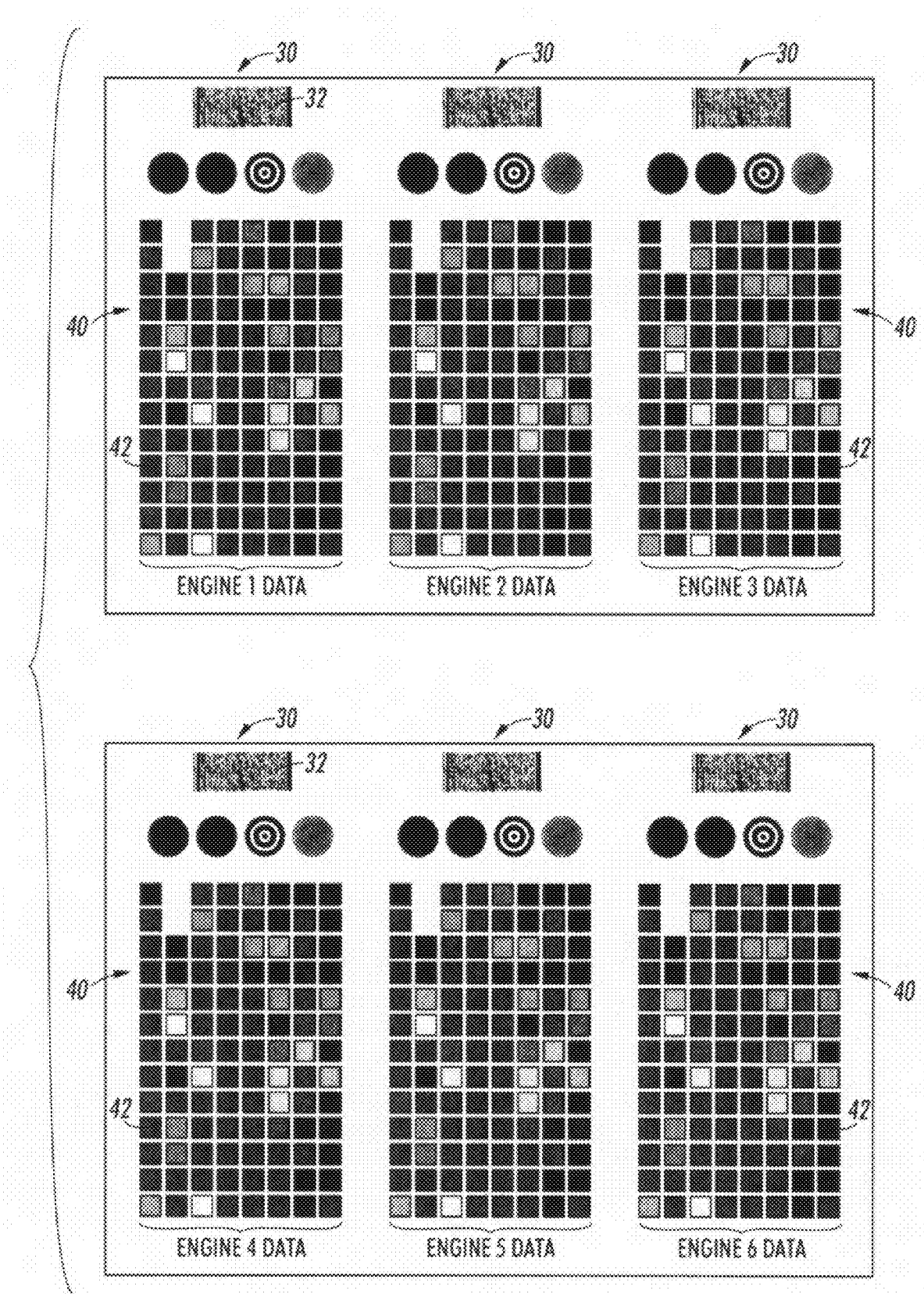

The "quick set" prints can be adapted for an integrated printing system or rack mounted printing system by printing a data glyph and reference patch set for each image marking engine in the system (i.e. FIGS. 3 and 4). In an integrated parallel printing system, multiple image marking engines can be present within the system. These devices operate in parallel to produce the required output job stream. Controlling the color output of each engine so that the system output appears uniform and equal is a difficult problem. One proposed solution is to have each engine in the system generate a color calibration print on the same side of a media sheet that would be scanned. The scanned image would be processed and adjustments would be made to each engine as needed. This process is repeated until all engines are within a predetermined window of acceptability (i.e. matching output).

A similar process can be used to calibrate a plurality of image marking engines in a printing system as well. This can be done by printing a set of reference patches respectively for each image marking engine which are then scanned by a calibrated color spectrophotometer and corrections are made to operating set points based on the result. It is proposed here that once the print system is adjusted to produce acceptable or matching output, the operator or customer could print a special sheet that would contain a data glyph 30 and a reference patch set 40 for each image marking engine in the system. This special sheet or 'quick set' print contains actual patches 42 the machine would use as target values, and encoded data 32 in a glyph 30. The data glyph 30 contains image settings, xerographic settings, rendering options, transfer/media related adjustments and other job attributes. This 'quick set' print would be saved and scanned at a later date to speed the set-up process for job reprints or similar jobs using the same or similar media.

In one illustrative embodiment, data glyphs 30 can be two dimensional bar codes that can encode digital information, as described in U.S. Pat. No. 5,991,469, the disclosure of which is totally incorporated herein by reference. However, it should be appreciated that bar codes or any other techniques for encoding data can be used in other embodiments as well.

The data glyphs 30 can include image settings, xerographic settings, rendering options, image path settings, transfer/media related adjustments, and other job attributes. Data glyphs 30 can be utilized because they possess error resistant qualities and are amenable to being used in scanners or facsimiles without losing the capability of storing encoded data that can still be interpreted by e-mail/fax server after being transmitted. Moreover, data glyphs 30 also retain their error resistant qualities after repeated scans, fusing, and/or facsimile transmissions. Thus, a given data glyph can be reused and sent to any number of destinations for communication of job attributes of a "quick set" print. The "quick set" print can be saved and scanned at a later date to speed the set-up process for job reprints or similar jobs using the same or similar media.

In one exemplary embodiment, the scanner detects which job attributes have been used by the quick set print, it interprets the corresponding data glyph 30 to determine the type of job attributes that were used in the quick set print and applies same to the job attributes of the same or other image marking engines for subsequent prints. In this manner, the subsequent prints are consistent with the prints that occurred at the time of the "quick set" print(s).

When calibrating the printer, the stored master image or quick set print, is fed to a printer 9 via a compensating circuit 7 which allows the master image to pass therethrough without processing.

The scanned master image is also fed to an analyzer 3 which compares the image data values of the scanned image with compensated master image data values fed from the master image memory 10. The master image data is compensated by a transformation circuit which adjusts the master image data so that the master image data can be compared with corresponding scanned data.

The analyzer 3 determines the errors or differences between the two associated images and produces calibration values therefrom which are stored as a screen matrix or matrices in a calibration values memory 5. The calibration values are used by compensating circuit 7 to correct image data subsequently sent to the printer 9 so that the image is reproduced consistently.

The calibration process utilized by the present disclosure may be any conventional calibration process. For example, in a digital reprographic system that reproduces either continuous tone or half-tone pictorials, a digital screen or digital screening method is utilized to convert the monochrome multi-level image into a monochrome bi-level image targeted for a specific printer. Digital screens can be specified by two independent functions; a dot growth pattern and a threshold level array. The dot growth pattern defines a shape of each halftone dot and how that dot will be filled. The total number of positions within each dot determines the maximum number of the unique grey levels which can be reproduced (N+1). Typically, a digital reprographic system will have many dot growth patterns, error diffusion, and spot overlap tables which are optimized for different types of pictorials.

The threshold level array, of size N, defines the bi-level decision values for each position in the dot growth pattern. By substituting a threshold level array element into the dot growth pattern having the same index, a unique screen matrix is formed. Thus, by adjusting the values of the threshold level array, brightness, contrast, and detail of the pictorial reproduced thereon, the printer can be changed independent of the dot growth pattern. Due to this independence, the values for the threshold level array, which on a target printer result in a linear change in reflectance, can be quantized to N+1 levels.

Given a specific dot growth pattern, a calibration print can be generated which contains patches. Each patch is an area filled with multiple, adjacent copies of the dot pattern at a specific stage in the growth sequence. Since N+1 grey levels can be represented using a dot growth pattern of size N, N+1 patches are generated on a calibration print; one for each possible grey level. Once printed, each patch exhibits a reflectance value which can be measured. Thus, the set of N+1 patches represent all the possible reflectance values which can be printed on the target printer for a specific dot growth pattern.

By setting each element in the threshold level array to the measured reflectance of the corresponding patch, a screen matrix, which is linear in reflectance, can be obtained for a specific printer and dot growth pattern. Thus, the process to generate linear reflectance screens for a given dot growth pattern and printer can be summarized as the generating of a bi-level calibration print with patches for each stage of the dot growth sequence; printing the calibration print on the target printer; measuring the reflectance of each patch on the calibration print; setting the value of each element of the threshold level array to the corresponding patch reflectance; and building a new screen matrix from the original dot growth pattern and the new threshold level array.

Utilizing the calibration process described above, a semi-automatic procedure can be utilized to calibrate digital reprographic systems. Since it is typical for an image scanner to be used in the capture of pictorials, it is possible to use the same scanner for the patch reflectance measurement step described above. This is accomplished by scanning the calibration print from each printer and numerically averaging the reference patch areas to determine the resulting reflectance of each reference patch. Moreover, the reference patches may be wheels to provide more calibration information per media sheet. For example, a color wheel will allow calibration of hue and saturation at a specific luminance.

The data glyph 30 or other type of machine-readable encoded data can be placed on the media sheet to uniquely identify each quick set image. This encoded data can contain information, such as time, date, machine serial number, master image name, master image serial number, etc., which can be used by the analysis program.

The present disclosure has been described with reference patches; however, the calibration sheet may contain any test object, such as grey patches, color patches, color wheels, grey balance wheels, line growth patterns, dot growth patterns, sweeps for grey balance, etc. The present disclosure is not limited to merely reference patches, but is applicable to any printed object which assists in the calibration, diagnosis, or testing of a printer.

While the present disclosure has been described with reference to various embodiments disclosed herein before, it is not to be confined to the detail set forth above, but is intended to cover such modifications or changes as made within the scope of the attached claims.

The invention claimed is:

1. A system for color job matching in a printing system, comprising:
   a plurality of image marking engines;
   a first test image printed by a first image marking engine on a media document, said first test image having a data glyph and a plurality of reference patches;
   a second test image printed by a second image marking engine on said media document, said second test image having a data glyph and a plurality of reference patches;
   said first and said second test images printed on the same side of said media document; an image capture device for scanning said media document;
   said scanned first and second test images providing calibration data for matching color correction tables of said first image marking engine and said second image marking engine, wherein said data glyph and said reference patches of both said scanned first and second test images are compared with retrieved color correction tables for generating compensation values based on a difference between the scanned image set-up data and the color correction tables for at least a first subsequent image document on said first image marking engine or said second image marking engine; and,
   said set-up data is provided to said second image marking engine and a third image marking engine for matching said at least a first subsequent image document from said second image marking engine or said third image marking engine to said first test image document of said first image marking engine.

2. The system of claim 1, wherein said reference patches providing said color parameters of said first and second test images for generating set-up data therefrom.

3. The system of claim 2, wherein said data glyphs providing said job attributes on said first and second test images for generating set-up data therefrom.

4. A system for color job matching in a printing system, comprising:
   a plurality of image marking engines;
   a first test image printed by a first image marking engine on a media document, said first test image having a data glyph and a plurality of reference patches;
   a second test image printed by a second image marking engine on said media document, said second test image having a data glyph and a plurality of reference patches;
   said first and said second test images printed on the same side of said media document; an image capture device for scanning said media document;
   said scanned first and second test images providing calibration data for matching color correction tables of said first image marking engine and said second image marking engine, wherein said data glyph and said reference patches of both said scanned first and second test images are compared with retrieved color correction tables for generating compensation values based on a difference between the scanned image set-up data and the color correction tables for at least a first subsequent image document on said first image marking engine or said second image marking engine;
   said reference patches providing said color parameters of said first and second test images for generating set-up data therefrom;
   said data glyphs providing said job attributes on said first and second test images for generating set-up data therefrom;
   at least a third test image printed by at least a third image marking engine on said media document, said at least third test image having a data glyph and a plurality of reference patches; and,
   said first, said second, and at least said third test images printed on the same side of said media document.

5. The system of claim 4, wherein said scanned first, second, and third test images providing calibration data for matching color correction tables of said first, said second, and said at least third image marking engines.

6. The system as claimed in claim 1, wherein said set-up data is provided to said first image marking engine or said second image marking engine for matching said at least a first subsequent image document from said first image marking engine or said second image marking engine to said first test image of said first image marking engine.

7. A system for color job matching in a printing system, comprising:
- a plurality of image marking engines;
- a first test image printed by a first image marking engine on a media document, said first test image having a data glyph and a plurality of reference patches;
- a second test image printed by a second image marking engine on said media document, said second test image having a data glyph and a plurality of reference patches;
- said first and said second test images printed on the same side of said media document; an image capture device for scanning said media document;
- said scanned first and second test images providing calibration data for matching color correction tables of said first image marking engine and said second image marking engine, wherein said data glyph and said reference patches of said scanned image data are compared with retrieved color correction tables for generating compensation values based on a difference between the scanned image set-up data and the color correction tables for at least a first subsequent image document;
- said set-up data is provided to said first image marking engine or said second image marking engine for matching said at least a first subsequent image document from said first image marking engine or said second image marking engine to said first test image of said first image marking engine; and,
- said set-up data is provided to said second image marking engine and a third image marking engine for matching said at least a first subsequent image document from said second image marking engine or said third image marking engine to said first test image document of said first image marking engine.

8. The system of claim 7, wherein said set-up data includes information for calculating and updating color correction tables and actual set-up targets for at least a second subsequent image document; and,
- said at least a first subsequent image document printed from said second image marking engine and said at least a second subsequent image document printed from said third image marking engine.

9. A system for color job matching in a printing system, comprising:
- a plurality of image marking engines;
- a color calibration image printed by each of said plurality of image marking engines;
- said plurality of color calibration images printed on a same side of a media document wherein each said color calibration image positioned on said media document to maximize the number of said color calibration images printed on said same side of said media document;
- said plurality of color calibration images scanned by a calibrated color spectrophotometer and each of said plurality of image marking engines corrected for adherence to operating set points;
- each said color calibration image including a series of color reference patches and an encoded data glyph comprising job attributes; and,
- said data glyph job attributes are dependent upon print settings of said image marking engines and are selected from the group consisting of image settings, xerographic settings, rendering options, transfer related adjustments, and media adjustments for facilitating the set-up process of a subsequent matching color image.

10. The system of claim 9, wherein said plurality of color calibration images are scanned and the associated said reference patches and said data glyphs are used as set-up data including information for calibrating and updating color correction tables and actual set-up targets for each of said plurality of image marking engines.

11. A method for color job matching in a printing system, comprising:
- printing a first color calibration image from a first image marking engine on a media sheet;
- moving said media sheet to a second image marking engine and printing a second color calibration image on a same side of said media sheet;
- repeating the steps above until all the image marking engines in the printing system have printed a color calibration image on said media sheet or until said media sheet can no longer accommodate another color calibration image;
- said color calibration images each having a data glyph and a plurality of reference patches wherein said data glyph recording distinct job attributes and said reference patches recording color values of respective said color calibration images;
- said job attributes are dependent upon print settings of said image marking engines;
- scanning said color calibration images;
- compensating said reference patches for repeated reimaging; and,
- generating set-up data from said data glyph and said reference patches, said set-up data includes information for calibrating and updating color correction tables and actual set-up targets for each of said image marking engines.

12. A method for color job matching in a printing system, comprising:
- printing a first color calibration image from a first image marking engine on a media sheet;
- moving said media sheet to a second image marking engine and printing a second color calibration image on a same side of said media sheet;
- repeating the steps above until all the image marking engines in the printing system have printed a color calibration image on said media sheet or until said media sheet can no longer accommodate another color calibration image;
- said color calibration images each having a data glyph and a plurality of reference patches wherein said data glyph recording distinct job attributes and said reference patches recording color values of respective said color calibration images;
- scanning said color calibration images;
- compensating said reference patches for repeated reimaging;
- generating set-up data from said data glyph and said reference patches, said set-up data includes information for calibrating and updating color correction tables and actual set-up targets for each of said image marking engines;
- providing another media sheet to said printing system for printing a remainder of color calibration images from other image marking engines;
- repeating the steps above until said other image marking engines in the printing system have printed a color calibration image on said another media sheet or until said another media sheet can no longer fit another color calibration image;

said remainder of color calibration images each having a data glyph and a plurality of reference patches wherein said data glyph recording distinct job attributes and said reference patches recording color values of respective said color calibration images;

scanning said remainder of color calibration images;

compensating said reference patches for repeated reimaging; and, generating set-up data from said data glyph and said reference patches, said set-up data includes information for calibrating and updating color correction tables and actual set-up targets for each of said other image marking engines.

13. The method of claim 12, further comprising:

comparing scanned image data of all said color calibration images with retrieved prestored image data from each of said respective image marking engines for generating compensation values based on a difference between said scanned image data and said prestored image data.

14. The method of claim 11, wherein said data glyph comprises job attributes selected from the group consisting of image settings, xerographic settings, rendering options, transfer related adjustments, and media adjustments.

15. The method of claim 14, further comprising:

generating set-up data from said data glyph and said reference patches, said set-up data includes information for calibrating and updating color correction tables and actual set-up targets for at least another image marking engine.

16. The method of claim 11, further comprising:

generating set-up data from said data glyph and said reference patches, said set-up data includes information for calibrating and updating color correction tables and actual set-up targets for at least another image marking engine.

17. The method of claim 16, wherein said set-up data is provided to said another image marking engine for matching at least a first subsequent image document from said another image marking engine to said first color calibration image from said first image marking engine.

18. The method of claim 16, wherein said set-up data is provided to said another image marking engine for matching at least a first subsequent image document from said another image marking engine to said first color calibration image from said first image marking engine or to said second color calibration image from said second image marking engine.

* * * * *